Figure 1:
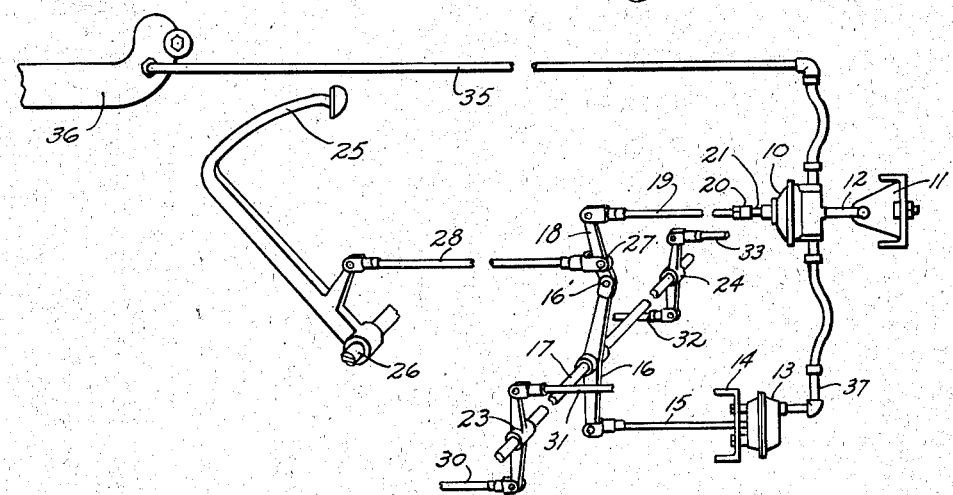

Feb. 25, 1941.  A. E. ROY  2,232,974
VACUUM POWER BRAKE APPARATUS
Filed June 25, 1937    2 Sheets-Sheet 2
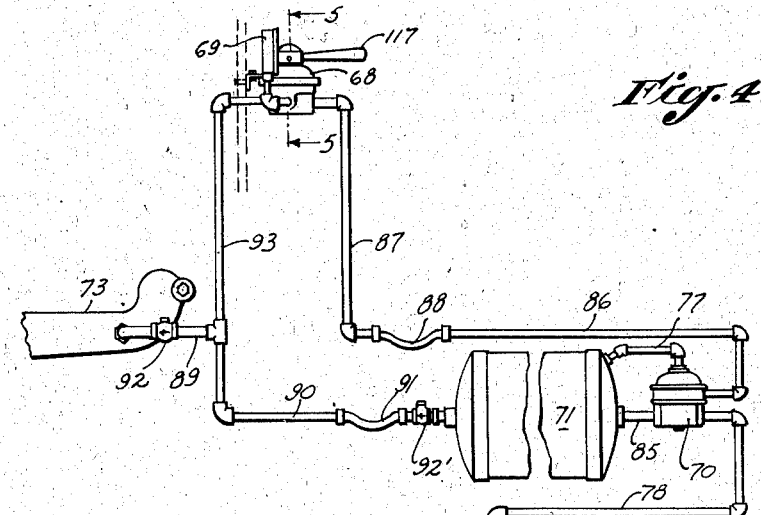
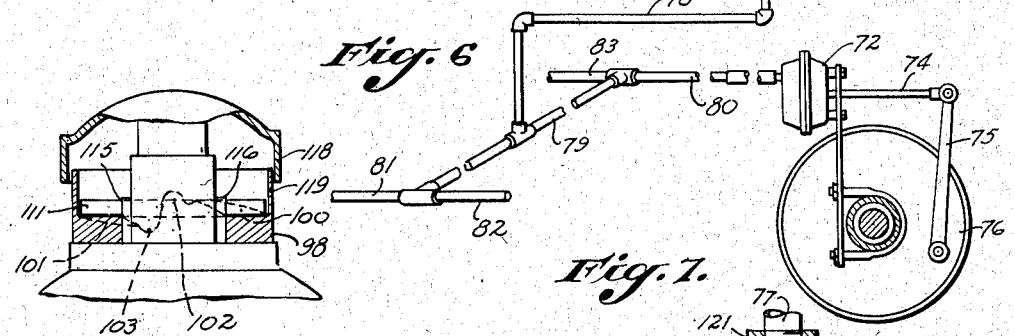
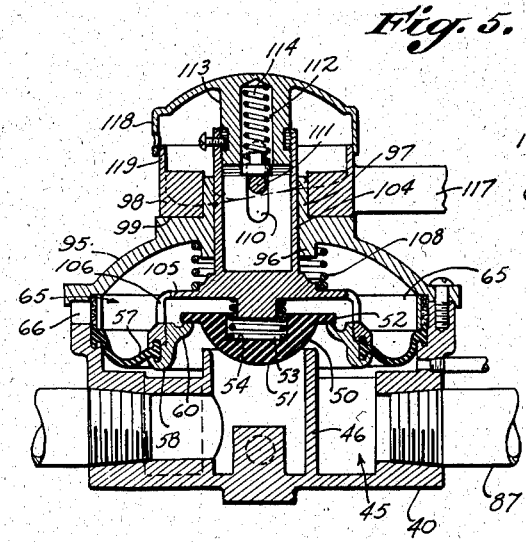
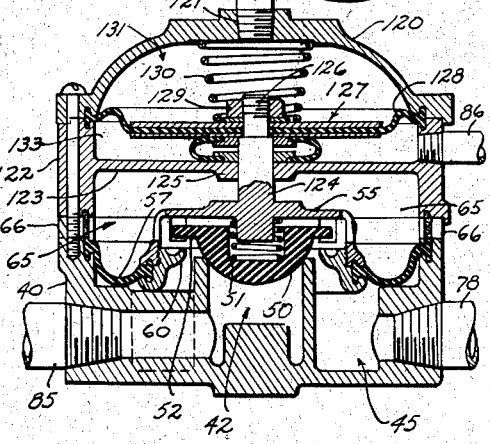
INVENTOR.
Albert E. Roy,
BY
ATTORNEY.

Patented Feb. 25, 1941

2,232,974

UNITED STATES PATENT OFFICE 2,232,974

VACUUM POWER BRAKE APPARATUS

Albert E. Roy, Los Angeles, Calif., assignor to Vacuum Power Brake Company, Los Angeles, Calif., a corporation of California Application June 25, 1937, Serial No. 150,345

5 Claims. (Cl. 303—54)

This invention is a continuation in part of my copending application Serial No. 748,272, filed October 15, 1934, now Patent No. 2,144,853 issued Jan. 24, 1939, and relates to pneumatic control apparatus and particularly to improvements in control valves of the general type illustrated therein, for utilizing the intake manifold vacuum of an internal combustion engine to actuate the brakes of an automobile, truck, trailer, or the like vehicle.

Heretofore in apparatus related to this invention where vacuum-operated vehicle brakes were controlled by means of semi-automatic manually operated valves of the type where the applied braking force is a variable value proportional only to the displacement of the valve control and substantially independent of the duration of such displacement, diaphragm valves of various types have been usually employed for the automatic operation of certain of the essential control mechanisms thereof.

In the employment of diaphragms and particularly as to continuous diaphragms supported at the edges and center which also directly serve as components of valve mechanisms, certain disadvantages are encountered such as fluttering, leakage, and sluggish response due apparently to the inertia and internal stresses necessarily developed upon flexure of such structures. Other possible reasons for imperfect operation of continuous diaphragms which also serve as valve elements may be due to their natural tendency to periodic fluctuations, and due to slight disalignments between diaphragm and valve elements which may be initially present in the valve structure or which may develop by wear after a long period of operation. Valves of this type are particularly susceptible to the development of leakage where the contact surfaces of the valve portions of the diaphragm have a large diameter and depend upon perfect parallelism of the contacting and seating surfaces thereof to form an air tight seal.

It has been found that control valves of the diaphragm type are more satisfactory and positive in operation and freer from detrimental leakages when constructed in the form of a modified annulus combined with means for automatically retaining or maintaining the proper alignment and contact between the valve portions thereof. It has also been found that the self-aligning valve of this type is freer from leakage, is quieter in operation, and is longer lived than the conventional non-self-aligning diaphragm types.

Objects of this invention are, therefore, to provide a control valve of improved design which is free and will remain substantially free from leakage over long periods of operation without compensation or adjustment of any kind for wear or the necessity of frequent replacement of parts.

Another object of this invention is to provide an improved valve means for controlling vacuum actuated apparatus which is positive and quiet in operation.

Another object of this invention is to provide an apparatus of the above character which is sensitive in operation and economical in construction and maintenance.

Other objects and novel features of this invention will be evident hereinafter.

Figure 2:
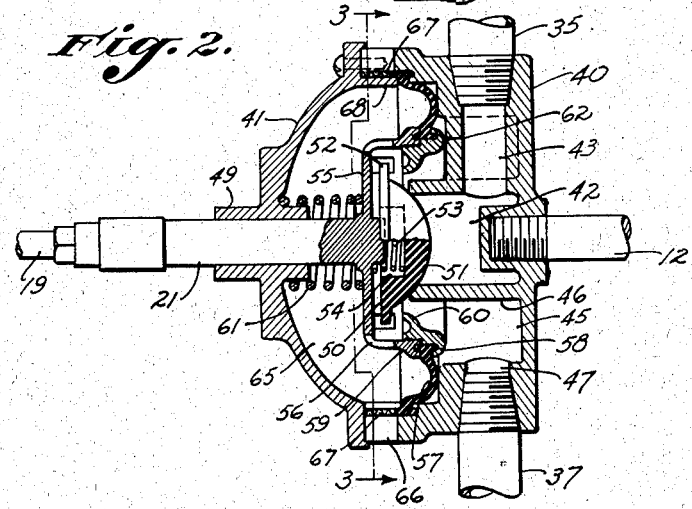
Figure 3:
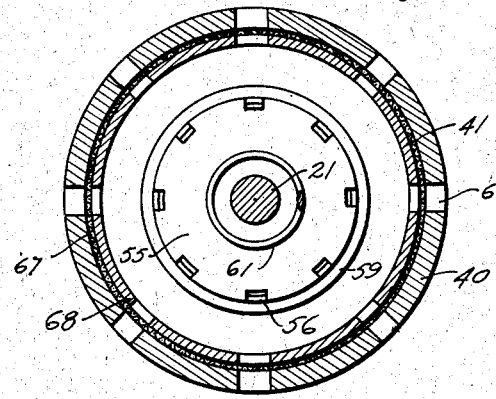

In the accompanying drawings which illustrate a preferred embodiment of this invention, Fig. 1 is a diagrammatic partial perspective of the general arrangement of the apparatus. Fig. 2 is a longitudinal cross-section of the control valve taken along a vertical plane; Fig. 3 is a cross-section of the control valve taken on line 3—3 of Fig. 2; Fig. 4 is a fragmentary side elevation partly in perspective of a general arrangement of modified form of the vacuum actuated apparatus and control mechanism as it may be applied in the installation on a trailer; Fig. 5 is a cross-section of a hand-controlled valve taken on line 5—5 of Fig. 4 with the elements therein shown in an open position and showing the actuating mechanism for regulating the degree of vacuum applied through the valve, Fig. 6 is a fragmentary sectional elevation of the upper portion of the hand-controlled valve shown in Fig. 4, but viewed at right angles thereto; Fig. 7 is a longitudinal cross-section of the relay control valve shown in Fig. 4 with the elements thereof shown in their normal positions.

Referring to the drawings and particularly to Fig. 1, 10 is the control valve shown in cross-section in Figs. 2 and 3 which may be pivotally attached to the vehicle chassis not shown. The suitable structural member 11 of the vehicle chassis by means of the threaded rod 12. 13 is a booster mechanism of conventional design, the body portion of which may be rigidly attached to another suitable structural member 14 of the vehicle chassis, as illustrated in more detail in my copending application, Serial No. 748,272. The rod 15 extending from the diaphragm of the booster unit is connected to one end of a double ended crank 16, which is keyed to a shaft 17, which is rotatably supported in suitable bearings attached to the vehicle chassis not shown. The opposite end of crank 16 is in turn connected at 16' to one end of the lever 18, the opposite end of which is also connected to a control rod 19 attached through the coupling connection 20 to the stem 21 of the control valve 10. A foot pedal 25 which is rotatably supported on the vehicle chassis at 26 is connected to an intermediated pivot point 27 of the lever 18 by means of the rod linkage 28.

At the end portions of the shaft 17 are provided double ended cranks 23 and 24 which are attached to pull rods 30—33 which lead to, and actuate, the brake mechanisms of the vehicle wheels.

A pipe 35 makes connection between the engine intake manifold 36 and the control valve 10. Another pipe 37 makes connection between the control valve 10 and the booster unit 13.

Referring to Figs. 2 and 3, in which the control valve 10 is shown in cross-section, 40 is the main housing or body portion thereof, and throughout the description, it will be regarded as the lower portion of the valve for convenience. The body portion 40 is annularly recessed at one end and is capped at that end by a hemispherical cover 41, which for convenience will be considered to be the top portion of the valve. The before-mentioned recesses in the body portion of the housing comprise an approximately cylindrical valve chamber 42, centrally located within the body portion 40 and in communication through a lateral opening 43 with the pipe 35 leading to the intake manifold 36, and an outer annular valve chamber 45 concentric with said chamber 42 and separated therefrom by a relatively thin cylindrical partition 46. The annular valve chamber 45 is in communication through another lateral opening 47 with the previously-mentioned pipe 37 leading to the booster unit 13.

A tubular-shaped guide member 49 is axially positioned in the top center of the hemispherical cover 41 and serves to guide the control valve stem 21. A resilient valve element 50 having an approximately hemispherical inner valve surface 51 and a diametrally encircling rim portion 52 is flexibly and movably supported adjacent the inner end extension of the valve stem 21 by means of a coil spring 53 retained for the most part within a suitable cylindrical recess 54.

The inner end of the valve stem 21 also carries as an integral part thereof, an inverted cup-shaped supporting spider member 55 having a plurality of side ports 56.

An approximately annular-shaped flexible seal 57 formed of rubber or other suitable material, extends between the wall of the valve body and the periphery of the spider member 55. The outer edge of said flexible annular seal 57 carries a T-shaped section or rib by means of which it is securely clamped in annular grooves between the body portion 40 and the cover 41. The inner edge of the flexible seal is similarly clamped under the lower edge of the supporting spider member by means of an externally threaded annular ring 58. In this connection I find it highly advisable to curve or roll the seal 57 slightly, to allow ample movement thereof without placing any stress or strain therein.

The ring 58 carries a concentric annular valve seat member 60 positioned adjacent the lower surface of the diametral rim portion 52 of the valve element 50.

A coil spring 61 extends between the cover 41 and the spider 55 and acting under compression tends to force the valve stem 21, the spider member 55, and the ring 58 carrying the inner edge of the annular diaphragm 57 in an inward direction toward the body portion of the control valve. The inward motion of the valve stem 21 and the associated valve elements is normally limited by contact of the inner edge of the ring member 58 with the body portion of the valve at the point 62 on the outer cylindrical surface of the lateral opening 43.

The annular-shaped flexible diaphragm together with the clamp ring 58, the annular valve seat 60, and the hemispherical valve element 50, form in effect a partition extending across the control valve and dividing it into three chambers namely; the central cylindrical valve chamber 42, which is in communication through the lateral opening 43 with the pipe 35, the annular valve chamber 45 which is in communication through the lateral outlet 47 with the pipe 37, and the upper atmospheric chamber 65 contained in the forward portion of the control valve under the hemispherical cover 41.

The said outer chamber 65 is maintained in communication with the atmosphere by means of a plurality of vent holes 66 which extend radially through the upper margin of the wall of the valve body where it joins the cover 41 as best shown in Fig. 3. A fine mesh screen 67 extends across the vent holes between the inwardly extending flange 68 of the cover 41 and the adjacent portion of the valve body wall, for the prevention of the entrance of dirt into the atmospheric chamber 65.

The operation of the apparatus illustrated in Figs. 1, 2, and 3 is as follows:

When the elements of the apparatus and the control valve are in the positions shown in Figs. 1 and 2, the brakes are in their normal or fully released positions and the internal parts of the valve structure are in the positions shown in detail in Fig. 2, that is, the spherical surface 51 of the valve member 50 is seated upon the inner curved edges of the cylindrical partition 46 and closes the central cylindrical chamber 42, and the said valve member 50 is held in this position by the downward force of the coil spring 53, and the differential pressure between the chamber 65, which is at atmospheric pressure, and the chamber 42 which is at sub-atmospheric pressure. The valve seat member 60 is clear of contact with the inner surface of the valve rim 52 as shown, making a passageway therebetween from the annular valve chamber 45 and through the ports 56 in the spider member 55 to the atmospheric chamber 65. Air at atmospheric pressure from the said atmospheric chamber 65 thus has access to the annular chamber 45 and thence by way of the lateral opening 47 and the pipe 37 to the booster unit 13. Under this condition, the cylinder of the booster unit is at atmospheric pressure and consequently no force is applied to the braking mechanism through rod 15.

When pressure is applied to the foot pedal 25, the resultant forward motion of the rod 28 causes the lever 18 to rotate momentarily in a counterclockwise direction about the upper end connection 16' of the crank 16 which in turn results in a momentary outward motion of the rod 19 and attached valve stem 21 from the control valve 10. This motion causes the supporting spider member 55 to move outwardly in a direction away from the body portion of the control valve, and to carry with it the ring 58, the inner edge of the flexible diaphragm 57, and the attached annular valve seat portion 60. Upon sufficient outward movement of the valve stem 21, the annular valve seat 60 is first brought into contact with the inner face of the valve rim 52 and thus seals the annular chamber 45 off from the atmospheric chamber 65. Upon continued outward movement of the valve stem 21, the hemispherical surface 51 of the valve element 50 is next lifted off of rim of the cylindrical partition 46, thus opening a passageway from the central valve chamber 45 to the annular valve chamber 42, and thereby establishing communication through pipes 35 and 37 from the region of sub-atmospheric pressure in the intake manifold 36 to the booster unit 13. The following reduction of pressure in the power chamber of the booster unit 13, results in tension in the rod 15 which, in turn, causes a counter-clockwise rotational movement of the double ended crank 16 and the cranks 23 and 24 associated therewith upon the shaft 17. The said counter-clockwise rotational movement of the double ended cranks 23 and 24 results in tension in the brake pull rods 30—33 which lead to the brake mechanisms at the vehicle wheels. The previously mentioned counter-clockwise rotational movement of the crank 16 also results in a clockwise rotational displacement of the lever 18 about the pivot connection 27, and thus in inward motion of the rod 19 and the valve stem 21 into the control valve 10. The accompanying inward motion of the spider member 55, the annular valve seat portion 60, and the hemispherical valve element 50 results in the reseating of the spherical surface 51 of the valve element upon the rim of the cylindrical partition 46 thus cutting off further communication between the valve chambers 42 and 45 and between the sub-atmospheric pressure region of the manifold 36 and the working chamber of the booster unit 13. However, the valve seat 60 is not at this point disengaged from the rim 52 by this compensating motion of the valve stem 21.

It is thus apparent that for any given depression of the foot pedal 25 resulting in a displacement of the valve mechanism in the control valve unit 10, that a counteracting or restoring movement of the same valve mechanism is immediately effected by the resultant motion of rod 15 of the booster unit 13 acting through crank 16 and lever 18 as described hereinabove. This results in the application of pressure to the braking mechanism which is proportional to the deflection or angular displacement of the brake pedal 25. Over braking by continued pressure upon the brake pedal is thus obviated.

Upon a release of the pressure from brake pedal 25, subsequent to the operations of applying the brakes as previously described, the valve stem 21 will be relieved of the force acting through the rods 19 and 28 and the spider element 55 acting under the force of the compressed coil spring 61 and the differential pressure between the atmospheric chambers 65 and 45 will move inward until the annular valve seat portion 60 is unseated from the inner face of the valve rim 52 of the valve element 50 as shown in Fig. 2, resulting in the opening of passageway from the annular valve chamber 45 through the openings 56, in the spider, into the atmospheric chamber 65. Air at atmospheric pressure is thus enabled to flow through the vent holes 66, ports 56, through the valve between the rim 52 and the valve seat 60, into the annular valve chamber 45, and thence through pipe 37 to the booster unit 13, resulting in a reduction of force applied through the rod 15, and through the before-described associated linkages to the braking mechanisms. This reduction of force results in a counteracting motion through the crank 16 and lever 18 resulting in an outward movement of the valve stem 21 and the reseating of the valve rim 52 upon the valve seat 60, and the cutting off of further inflow of air to the booster unit. The reduction of the braking force is thus obviously also proportional to the backward or restoring motion of the brake pedal 25.

Referring now to Fig. 4 which is a modified general arrangement of the apparatus incorporating a relay control valve and which is particularly adapted to installation on a trailer, 68 is a hand-operated control valve having a vacuum gage 69. 70 is a vacuum-operated relay control valve, 71 a vacuum storage tank, 72 is a conventional type of vacuum booster unit, such as also shown at 13 in Fig. 1, and 73 is a fragmentary view of an engine intake manifold. The vacuum booster unit 72, which is a typical installation for each wheel of the trailer, contains an internal flexible diaphragm to which is attached the brake pull rod 74, which is in turn pivotally attached to the end of the brake actuating crank 75 of the brake drum 76. The said booster unit 72 is connected to the relay control valve 70 by way of pipes 78, 79, and branch pipe 80. Other branch pipes 81, 82, 83 serve to make connection from the relay valve 70 to the other booster units each of which actuates the braking mechanism for one of the several wheels of the trailer vehicle. The central valve chamber of the relay valve 70 is connected by way of pipe 85 to the vacuum storage tank 71. The lower control chamber of the relay valve 70 is connected to the hand-operated control valve 68 by way of pipes 86, 87, and the flexible coupling 88. The upper control chamber 131 of the relay valve is permanently connected by way of pipe 77 to the vacuum storage tank 71. The vacuum storage tank 71 is connected to the engine manifold 73 by way of pipes 89, 90, and the flexible coupling 91. A check valve 92 in pipe 89 serves to prevent the loss of vacuum in the storage tank 71 upon reduction of the vacuum in the engine intake manifold 73. Another check valve 92' which is preferably spring loaded, is provided between the flexible coupling 91 and the vacuum storage tank 71 to prevent loss of the stored vacuum in event the flexible coupling 91 is broken. The hand-operated control valve 68 is in communication with the engine intake manifold 73 and vacuum storage tank 71 by way of connecting pipe 93, 90 and flexible coupling 91.

The hand-operated control valve 68 may be conveniently supported within reach of the operator inside of the driver's compartment of the towing vehicle, upon a suitable structural member. The vacuum storage tank 71, relay valve 70, and booster unit 72 and its associated braking mechanism, together with the connecting piping up to the flexible couplings 88 and 91 may be carried by the trailer vehicle and when so arranged the couplings 88 and 91 constitute the flexible air connections between the towing vehicle and the trailing vehicle.

The main body portion of the hand-operated control valve 68, shown in detail in cross-section in Fig. 5 is substantially identical with that of the before-described control valve unit 10 shown in section in Fig. 2, and therefore carries the same identifying numerals. The flexible seal 57, the valve ring 58, valve seat 60, hemispherical valve element 50, and spring 53 are also substantially identical to those same elements previously described in Fig. 2 and likewise carry the same identifying numerals.

The hemispherical cover 95 for the body portion 40 of the hand-operated control valve carries on the inside, a short axially-positioned valve stem guide 96, and on the outside top of the cover a similar, axially-positioned valve stem guide 97 which also serves as a shaft about which a cam ring 98 is rotatably supported. The lower plane face of the cam ring 98 rests upon a shoulder-bearing surface 99 on the top central portion of the cover 95, surrounding the said valve stem guide cylindrical projection 97. The top of the cam ring 98 carries a pair of approximately helical-shaped cam surfaces 100 and 101 each of which extends approximately 180° around the ring and terminate in stop lugs 102 at their raised ends and recesses 103 at their lower ends as shown in Fig. 6.

The tubular valve stem 104 which extends through the valve stem guides 96 and 97, carries on the inner end, the movable valve mechanism which comprises a supporting spider 105 having a plurality of ports 106 at the periphery, a threaded ring 58 which serves as a clamp for the inner edge of the annular seal 57 and also serves as a support for the annular valve seat 60, the valve stem lug 107 which projects centrally from the under side of the spider 105 and which serves as a retainer and guide for the hemispherical valve element 50, and a coil spring 53, which extends between the supporting spider 105 and the bottom of the socket 54 of the said hemispherical valve element 50. A coil spring 108 extends between the inside top of the cover and the supporting spider 105 and acts under compression to urge the valve stem 104 and the associated valve mechanism downward towards the body 40'.

The intermediate portion of the tubular valve stem 104 is provided with diametrically disposed, longitudinally elongated slots as shown at 110 through which a crosswise positioned pin cam rider 111 extends.

The cylindrical valve guide projection 97 is correspondingly longitudinally slotted at 115 and 116 to receive the cam riding pin 111 and to allow only longitudinal motion thereof upon rotation of the cam ring 98. The upper extremity of the tubular valve stem 104 is internally threaded to receive an externally threaded tubular projection 112 of a regulator knob 113. A coil spring 114 is retained within the tubular section of the said control knob projection 112 and is normally maintained under compression between the cam riding pin 111 and the top of the regulator knob 113.

The extending end portions of the cam riding pin 111 are urged against the upper cam surfaces 100 and 101 by the force of the spring 114, and the reacting force of said spring 114 urges the tubular valve stem 104, the valve spider 105, annular valve seat 60 and the annular flexible seal 57, upward within the valve housing. The upward force of the spring 114 is resisted by the coil spring 108 and the force caused by the differential pressure between the atmospheric chamber 65 and the valve chambers 42 and 45. The initial compression of spring 114 may be adjusted by the regulator knob 113 and varied at will by rotational movement of cam ring 98.

The cam ring 98 is rotated by a control handle 117 which extends radially therefrom. The adjusting knob 113 carries a downwardly projecting rim 118 which normally overlaps an upward projecting annular edge portion 119 of the cam ring 98 to form a protecting enclosure for the cam mechanism. The cam surfaces decrease in slope as they rise, so that notwithstanding the increased pressure of the cam riding pin upon the cam surfaces as the valve stem rises, the tangential force upon the control handle is substantially constant, throughout the operating angle.

As described hereinbefore, in connection with Fig. 2, the hand-operated control valve 68 of Fig. 5 is normally divided into three chambers namely, chamber 65 which is in communication with the atmosphere through the plurality of radial vent holes 66, the central valve chamber 42 which is in communication with the engine manifold 73 and the vacuum storage tank 71 by way of pipe 93, and the annular valve chamber 45 which is in communication with the relay valve 70 by way of the pipe 87.

A vacuum indicating gage 69 may be connected into the chamber 45 by means of a pipe 135 to serve as a visual indication of the braking force being applied to the booster units.

Referring to Fig. 7 which illustrates the relay valve 70 in cross-sectional view, the lower body portion 40 thereof is identical to the lower body portion of the control valve as illustrated in Fig. 2 and, therefore, carries the same identifying numerals. The hemispherical cover 120 is similar to that illustrated in Fig. 2, but instead of having a valve guide through the central portion thereof, a pipe connection 121 is substituted from which the pipe 77 extends to the vacuum storage tank 71.

An intermediate valve body section 122 having a mid-partition 123 is interposed between the hemispherical cover 120 and the body portion 40. The valve stem 124 extending upwardly from the spider member 55 and the associated valve elements, is shorter than the ones illustrated in the other types of valves and passes through a central valve guide opening 125 in the center of the partition 123 and terminates in a threaded portion 126 within the enclosure between the hemispherical cover 120 and the said mid-partition 123. A diaphragm 127 having a flexible outer margin 128 extends across the chamber formed between the said cover 120 and partition 123. The outer edge of the flexible margin 128 of the diaphragm 127 is clamped between the cover 120 and the top of the mid-section 122 in suitable annular recesses to form an air-tight seal. The center of the diaphragm 127 is fixed to the threaded end 126 of the valve stem 124 by means of a nut 129. A helical spring 130 acts under compression between the inside lower surface of the cover 120 and the top of the diaphragm 127 and urges the said diaphragm, valve stem, and the associated valve mechanism downward in the valve housing.

A flexible boot 132 surrounds the valve stem 124 and makes an air-tight connection between the lower surface of the diaphragm 127 and the upper surface of the partition 123. The cover 120 and the diaphragm 127 thus form an air-tight control chamber 131 of variable volume, which is in communication with the vacuum storage tank 71 through pipe 77, and the flexible diaphragm 127 and the partition 123 thus form another control chamber 133 of variable volume which is in communication with the control valve 70 through pipe 86.

The chamber 65 formed between the flexible diaphragm 57 on the lower side, and the partition 123 on the upper side, is vented to the atmosphere through a plurality of radial vent holes 66 arranged around the upper edge of the body portion as also illustrated and previously described in connection with Fig. 2.

The relay valve as illustrated in Fig. 7 is thus normally divided into five chambers, namely, the upper control chamber 131, in communication with the vacuum storage tank 71 through pipe 77, the lower control chamber 133 formed between the diaphragm 127 and the partition 123 in communication with the control valve 68 through pipe 86, the atmospheric chamber 65 in communication with the atmosphere through the vent holes 66, the annular valve chamber 45 in communication with the booster units through line 78, and the central cylindrical valve chamber 42 in communication with the vacuum storage tank 71 through pipe 85.

The operation of the apparatus in Figs. 4–7 is as follows:

Assuming that there is a sub-atmospheric pressure in the tank 71 and that the brakes are fully released, the relay valve mechanism will be in the position shown in Fig. 7 with the cylindrical valve chamber 45, pipe 78, and the booster unit 72 connected therewith, exhausted to the atmosphere, the hand control valve mechanism will be in the raised position shown in Fig. 5 with the hemispherical valve element 50 unseated from the top of the cylindrical valve chamber 42 and thus closing off the top of the annular chamber 45 from the atmosphere and connecting chambers 42 and 45 together, whereby the lower control chamber 133 of the relay valve will be in communication with the sub-atmospheric pressure of the manifold 73 and storage tank 71 by way of pipes 86 and 93. The upper control chamber 131 will be maintained at all times under the full sub-atmospheric pressure of the storage tank 71 by reason of the interconnecting pipe 77.

Under these conditions the control chambers 131 and 133 are at equal sub-atmospheric pressures and, therefore, no differential pressure acts upon the diaphragm 127. The helical spring 130 which is under compression is thus free to retain the diaphragm 127 and the valve mechanism connected therewith, in the depressed position as shown in Fig. 7, which is the position for the complete release of the brakes as previously described.

Now to apply the brakes, the handle 117 and the attached cam ring 98 are turned in a clockwise direction, as viewed from the top. This rotation of the cam ring 98 allows the valve stem 104 and the associated valve mechanism to lower into the valve housing until the spherical surface 51 of the valve element 50 is seated upon the rim of cylindrical partition 46, closing off the central valve chamber 42 from the annular valve chamber 45. Further downward movement of the valve stem next results in unseating the valve seat 60 from the valve rim 52 and the entrance of air from the atmospheric chamber 65 into the annular valve chamber 45 and thence by way of pipes 87 and 86 to the lower control chamber 133 of the relay valve. The resultant increase of pressure in the lower control chamber 133 by the entrance of the air, destroys the pressure balance between the control chambers on either side of the diaphragm 127 with the result that the said diaphragm 127 is subjected to a differential pressure which forces it upward against the opposing force of spring 130. The resultant upward movement of the diaphragm 127, valve stem 124 and the associated valve mechanism eventually causes the annular valve seat 60 to be brought up into contact with the under surface of the valve rim 52 immediately followed by the slight lifting of the valve element 50 and the unseating of its spherical valve surface 51 from the rim of cylindrical partition 46. This motion of the relay valve elements results in cutting off the annular valve chamber 45 from the atmospheric chamber 65 and at the next instant putting it into communication with the central sub-atmospheric valve chamber 42. The following reduction in pressure in the annular chamber 45 is transmitted through the pipe 78 to the booster unit 72 resulting in a corresponding reduction in pressure in the booster unit chamber and the immediate application of the brakes.

In releasing the brakes, the previously-described procedure of applying the brakes is reversed. For example, assume that the brakes have been fully applied as described hereinbefore. In this condition the relay valve control chamber 133 will be at atmospheric pressure and the resultant upward force acting on the diaphragm 127 will hold the valve stem and the associated valve mechanism up against the force of the spring 130. In this case, the valve element 50 will be supported by the annular valve seat 60 off of the rim of cylindrical partition 46 of the central valve chamber 42. Valve chambers 42 and 45 will thus be in communication and at full sub-atmospheric pressure. The booster units will also be at full sub-atmospheric pressure by reason of the interconnecting pipe 78.

When the brakes are in the fully applied condition, the control valve handle will be at its limit of clockwise rotation and the valve element 50 will be seated upon the top of the annular shoulder 46 of the control chamber 42 and the valve seat 60 will be unseated from the valve element rim 52. The annular chamber 45 of the control valve will thus be at full atmospheric pressure and by reason of the interconnecting piping 86—87 the control chamber 133 of the control valve will also be at full atmospheric pressure as previously mentioned.

Now, upon partial counter-clockwise rotation of the control valve, handle 117 the valve seat 60 will first be lifted into contact with the valve element rim 52, cutting off the chamber 45 from the atmospheric chamber 65. Next the valve element will be lifted slightly from the top of the valve chamber 42 resulting in exhaustion of air from the annular chamber 45 of the control valve and from the control chamber 133 of the relay valve through the interconnecting pipe 86—87. This in turn will result in a corresponding downward movement of the control valve elements which will allow entrance of air into the chamber 45 and a decrease in the degree of sub-atmospheric pressure in the booster unit with an attendant reduction of braking force.

As the pressure in the chamber 45 of the control valve is reduced by the said adjustment of the control handle 117, the differential pressure between the chambers 65 and 45 will increase until the downward force upon the valve element 50 and its associated structure is great enough to deflect spring 114, through which the supporting force is applied, sufficiently to reseat the spherical surface 51 of the valve element 50 upon the rim of partition 46 thus cutting off further reduction of pressure in the annular chamber 45.

Upon further counter-clockwise rotation of the control lever 117, the just-described operation is repeated, the release of the brakes following and remaining proportional to each increment of such counter-clockwise movement of the control handle 117.

Upon clockwise rotational movement of the control handle the reverse operation occurs. As the valve mechanism, in response to the clockwise motion of the handle 117 and the cam ring 98 moves downward carrying with it the annular flexible seal 57, and unseating the annular valve seat 60, the differential pressure between the chamber 65 and the chamber 45 is decreased by reason of the communication thus established between the chamber 45 and the atmospheric pressure in chamber 65. This decrease in differential pressure acting upon the valve element 50 and its associated structure decreases the loading and hence the deflection of the coil spring 114. When the differential pressure has thus become sufficiently lowered, the resultant elongation of the coil spring 114 will be sufficient to allow the valve seat 60 to again seat upon the valve rim 52, and thus to cut off further increase of pressure in chamber 45.

This automatic control of the degree of vacuum in the chamber 45 by the coil spring 114 as regulated by the handle 117 is transmitted through the pipe 87, flexible coupling 88, and pipe 86 to the expansible chamber 133 of the relay valve 70 shown in Fig. 7 as previously described.

Thus the braking force applied to the vehicle may be remotely controlled by means of the hand-operated control valve 68 through the action of the relay valve 70 and the magnitude of such resultant braking force is always proportional to the angular displacement of the control lever 117 which may be set and allowed to remain in any given position between full application and full release without varying the braking force from the value corresponding to such displacement. The maximum and/or minimum braking force applied to the booster units for any given angular displacement of the control handle 117 is adjustable by the knob 113 which acts to increase or decrease the initial compressive force acting upon the coil spring 114 as previously mentioned.

If desired, the relay valve 52 may be omitted and the main booster line 78 may be connected directly to the hand-control valve line 87. This omission of the relay valve may be desirable in some cases where the braking mechanisms to be operated are on the main vehicle in which the control valve 50 is installed, however, in the case of the trailer vehicle the provision of the relay valve unit as illustrated in Fig. 4 is usually desirable. If the hand control valve is directly connected to the booster, the normal position of the hand valve will be with the valve member face 51 engaging the rim of the annular partition 46, so that to apply the brakes the handle 117 is rotated in a counter-clockwise manner to close off chamber 45 from the atmosphere and establish sub-atmospheric connection between chamber 45 and chamber 42.

As previously stated, one of the principal features of this invention resides in the self-aligning properties of the valve mechanism, assuring at all times a perfect seal between the contacting valve surfaces. The freedom of movement allowed the valve element 50 between the supporting spider and the valve seat 60 by the spring 53, insures the perfect accommodation of the contacting valve surfaces to one another without regard to alignment or departure from truth of the various other elements of the valve mechanism. This results in a valve which is free from leakage and will, therefore, operate satisfactorily on low degrees of vacuum and will hold the braking control adjustments indefinitely.

Another important advantage and feature of this invention resides in the provision for automatic application of the brakes of the trailer vehicle in event the air connections between the towing vehicle and the trailing vehicle are broken for any reason. For example, if either or both of the flexible connections 88 and 91 becomes disconnected, air will immediately enter the control chamber 133 by way of pipe 86 resulting in full application of the brakes in the manner described hereinbefore. The check valve 92' will act to prevent loss of the sub-atmospheric pressure in the storage tank 71.

Another particular advantage of this invention resides in the construction of the valve elements whereby lost power in the manipulation of the control mechanism is minimized. The reduction of lost power is accomplished principally by the construction of the valve surface 51, with a diameter which is relatively small as compared to the diameter of the valve housing at the diaphragm section. This reduction of valve surface diameter results in a decreased initial force or pressure necessary to overcome the differential pressure acting upon the valve area, when initiating operations of the valve.

It should also be noted here that the valve structure of my invention eliminates lost motion and provides a control that is positive at all times, since in every case the valve members open and close almost instantaneously, so that there is no lag between full open and full closed positions, so that in effect the valve members are at all times either fully open or fully closed, and there is no overlap between the opening and closing operations.

It is to be understood that the foregoing is illustrative of the preferred embodiment of the invention and is not to be limited thereby, but may include many variations without departing from the spirit of the invention. The invention is, therefore, to be limited only to the scope of the following claims.

I claim as my invention:

1. In a vacuum-operated braking system for vehicles, a control valve comprising: a housing having a recessed body and a cover provided with a valve stem guide in its upper portion; a cylindrical partition in said body portion defining an outer annular valve chamber and a coaxial central valve chamber; an annular-shaped flexible seal fixed at its outer edge to said body portion and attached to a movable valve seat at its inner edge; a ported supporting spider for said movable annular valve seat; a self-aligning valve element adjacent said movable annular valve seat and the top of said cylindrical partition, said flexible seal and self-aligning valve element defining an additional chamber in communication with the atmosphere; a valve stem provided with a longitudinal slot centrally attached to said supporting spider and slidable in said valve stem guide; a pin extending through said valve stem slot; a member supported by a spring bearing on said pin and attached to said valve stem; and cam means for raising said pin to thereby raise said valve stem and its associated valve mechanism to operate said valve.

2. A control valve as described in claim 1 in which said cover is provided with a shoulder on the outside of its upper portion upon which said cam means is supported, and said valve stem guide means is provided with longitudinal slots registering with said slot in said valve stem.

3. In a vacuum-operated braking system for vehicles, a control valve comprising: a housing having a recessed body portion and a cover provided with a valve stem guide in its upper portion; a cylindrical partition in said body portion defining an outer annular valve chamber and a coaxial central valve chamber; an annular-shaped flexible seal fixed at its outer edge to said body portion and attached to a movable valve seat at its inner edge; a ported supporting spider for said movable annular valve seat; a self-aligning valve element adjacent said movable annular valve seat and the top of said cylindrical partition, said flexible seal and self-aligning valve element defining an additional chamber in communication with the atmosphere; a valve stem centrally attached to said spider and slidable in said valve stem guide; a cam of variable slope rotatably mounted on the outside of said cover; a follower adapted to ride on said cam; and spring means supported by said follower and associated with said valve stem whereby vertical movement of said follower caused by rotation of said cam moves said valve stem vertically through the medium of said spring to operate said valve.

4. In a vacuum-operated braking system for vehicles, a control valve comprising: a housing having a recessed body portion and a cover provided with a valve stem guide in its upper portion; a cylindrical partition in said body portion defining an outer annular valve chamber and a coaxial central valve chamber; an annular-shaped flexible seal fixed at its outer edge to said body portion and attached to a movable valve seat at its inner edge; a ported supporting spider for said movable annular valve seat; a valve element adjacent said movable annular valve seat and the top of said cylindrical partition, said flexible seal and valve element defining an additional chamber in communication with the atmosphere; a valve stem provided with a longitudinal slot centrally attached to said supporting spider and slidable in said valve stem guide; a pin extending through said valve stem slot; a member supported by a spring bearing on said pin and attached to said valve stem; and cam means for raising said pin to thereby raise said valve stem and its associated valve mechanism to operate said valve.

5. In a vacuum-operated braking system for vehicles, a control valve comprising: a housing having a recessed body portion and a cover provided with a valve stem guide in its upper portion; a cylindrical partition in said body portion defining an outer annular valve chamber and a coaxial central valve chamber; an annular-shaped flexible seal fixed at its outer edge to said body portion and attached to a movable valve seat at its inner edge; a ported supporting spider for said movable annular valve seat; a valve element adjacent said movable annular valve seat and the top of said cylindrical partition, said flexible seal and valve element defining an additional chamber in communication with the atmosphere; a valve stem centrally attached to said spider and slidable in said valve stem guide; a cam of variable slope rotatably mounted on the outside of said cover; a follower adapted to ride on said cam; and spring means supported by said follower and associated with said valve stem whereby vertical movement of said follower caused by rotation of said cam moves said valve stem vertically through the medium of said spring to operate said valve.

ALBERT E. ROY.